Oct. 29, 1963  A. W. LARKWORTHY  3,109,087
WELDING ELECTRODES
Filed Sept. 20, 1961  2 Sheets-Sheet 2
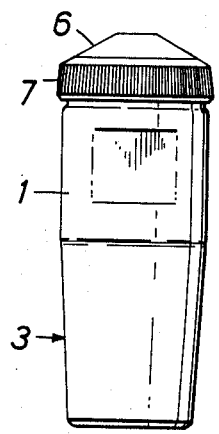
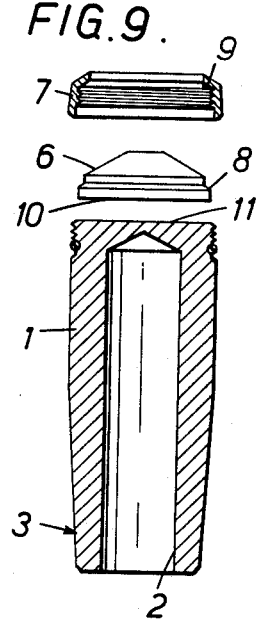
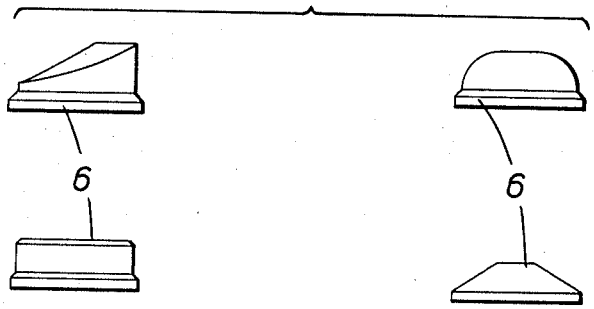
INVENTOR
ALAN W. LARKWORTHY
BY Gust and Irish
ATTORNEYS

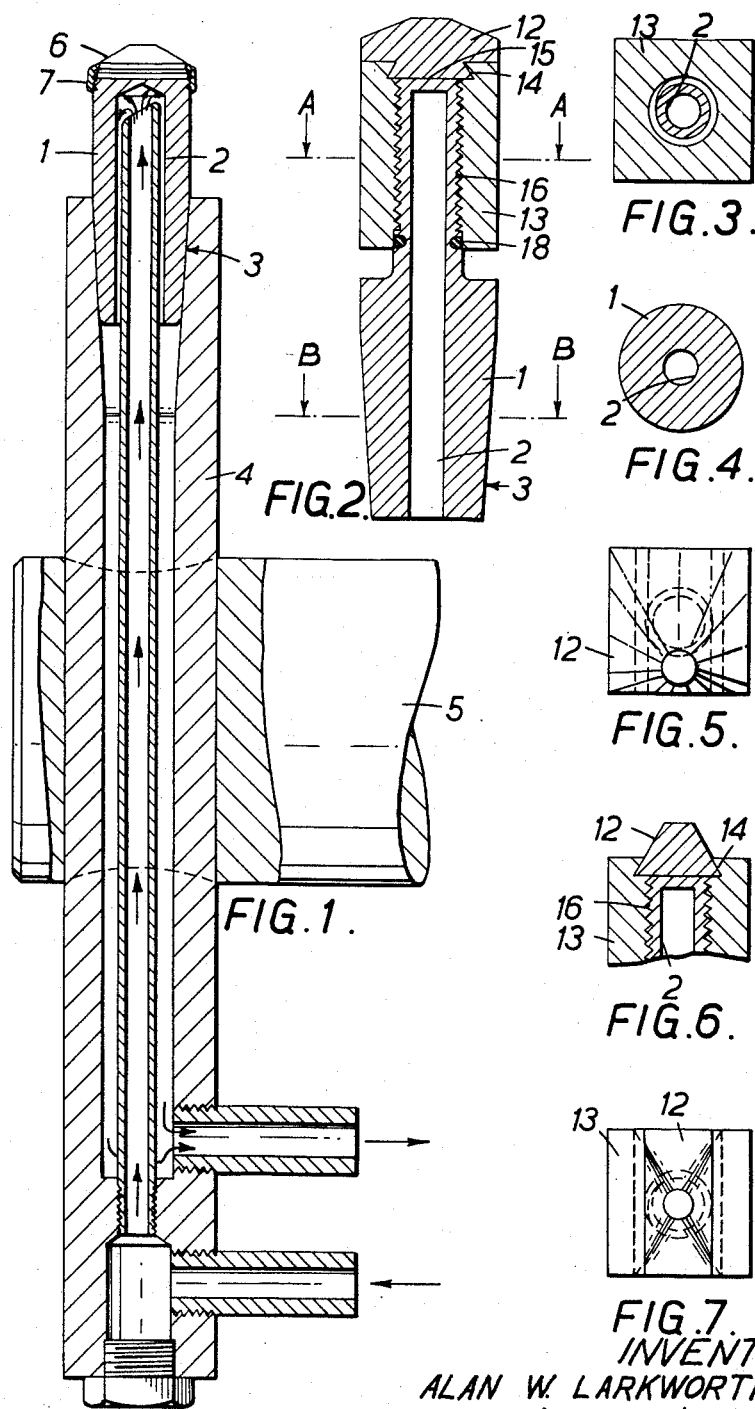

3,109,087
WELDING ELECTRODES
Alan Wilton Larkworthy, Farnham Royal, England, assignor to Sciaky Electric Welding Machines Limited, Slough, England
Filed Sept. 20, 1961, Ser. No. 139,472
Claims priority, application Great Britain Oct. 14, 1960
15 Claims. (Cl. 219—120)

This invention relates to resistance welding electrodes.

In use electrodes may be subjected to considerable wear due, for example, to pitting caused when an electric current flows between an electrode and a workpiece, or in another example, to deformation of the electrode tip as a result of the considerable pressure and heat occurring between an electrode and a workpiece in a spot welding machine.

Such wear limits the effectiveness of electrodes and it is usual when spot welding for electrodes to be retrimmed and replaced frequently. This reduces the available working time of a piece of equipment, and consequently many attempts have been made to reduce "break-down" or "servicing" time and the attendant expense.

A liquid cooled resistance welding electrode is normally housed in a piece of equipment by a joint, for example a machined taper, which fulfills two functions: it provides satisfactory electrical contact between the electrode and the equipment to enable high currents to be conducted to the electrode, and it provides a seal for cooling liquid.

It is thus undesirable to disturb a well made joint by removing the electrode for retrimming purposes.

It is an object of the invention to produce an electrode having a tip which is readily replaceable without the aid of a special tool and without disturbing the remainder of the electrode and its cooling system.

According to this invention a welding electrode comprises a body and a replaceable tip detachably connected thereto, the tip and the body having mating surfaces substantially transverse to the longitudinal axis of the body across which cooling effects and electric current can be transmitted from the body to the tip. Also in accordance with the invention a welding electrode comprises a hollow body shaped to permit circulation of liquid coolant through the body, a replaceable tip, and means for detachably connecting the tip to the body, the tip and the body having surfaces which mate in a plane normal to the longitudinal axis of the body across which cooling effects and electric current can be transmitted from the body to the tip.

According to one form of the invention the means for detachably connecting the tip to the body comprises a threaded ferrule and means are provided for locking the ferrule to the body. Conveniently, the locking means consists in a deformable insert located in a peripheral groove in the body.

According to another form of the invention the means for detachably connecting the tip to the body includes a sleeve internally threaded to correspond with an externally threaded part of the body, the sleeve having a dovetail housing transverse to the longitudinal axis of the sleeve to receive a dovetailed tip so that, when assembled, the threaded part of the body passes through the sleeve and abuts against the dovetail tip to hold it in position. Alternatively, the tip may be formed with a dovetailed housing and the dovetail formed on the sleeve. Conveniently the sleeve and the body may be secured by using a deformable insert.

The invention also includes a replaceable electrode tip having a surface shaped to mate with a corresponding end surface of an electrode body or a sleeve carried thereon and being arranged to co-operate with means for detachably connecting the tip to the body.

Various forms of welding electrode having a replaceable tip in accordance with the invention will now be particularly described by way of example with reference to the accompanying drawings, in which:

FIGURE 1 is a section through one arm and electrode support of a spot welding machine showing an electrode according to the invention in position;

FIGURE 2 is a section through an electrode according to the invention having a dovetailed tip;

FIGURE 3 is a section on A—A of FIGURE 2;

FIGURE 4 is a section on B—B of FIGURE 2;

FIGURE 5 is a top plan view of a tip similar to that of FIGURE 2 but having a laterally offset welding area;

FIGURE 6 shows, in section, a variation of a dovetailed tip;

FIGURE 7 is a top plan view of the tip of FIGURE 6;

FIGURE 8 is an elevation of an assembled electrode as shown in FIGURE 1;

FIGURE 9 is an exploded view of an electrode according to FIGURE 8; and

FIGURE 10 shows four different replaceable tips.

Referring to the drawings, a cylindrical electrode body 1 is bored at 2 to provide a closed path for liquid coolant. The path of the coolant is arrowed in FIGURE 1. The body 1 has a taper 3 machined on that part of the external surface adjacent the open end to co-operate with a taper in an electrode support 4 carried in an arm 5 of a spot welding machine.

A replaceable frusto-conical tip 6 is detachably secured to the electrode body 1 by an internally threaded ferrule 7 (see FIGURES 1, 8 and 9) threaded to correspond with an external thread on the body. The ferrule 7 has an inwardly extending flange 9 which co-operates with an outwardly extending flange 8 on the tip 6 to hold accurately machined mating surfaces 10 and 11 in contact.

Satisfactory surface contact is required to enable cooling effects and electric current to pass from the body to the tip. The mating surfaces 10—11 are usually machined flat and normal to the longitudinal axis of the body. However, where circumstances require a greater surface area, for example, when exceptionally high current densities are to be used, the mating surfaces may be slightly conical or slightly curved. Satisfactory cooling effects and flow of electric current across the surfaces depends on accurate machining and surface condition and to minimise surface oxidation the surfaces may be silver plated.

In a liquid cooled electrode, cooling of the tip also depends on the proximity of the liquid to mating surfaces and provided the mating surfaces are accurately machined, the end wall of the body can be made as little as $\frac{1}{32}''$ thick. The height of the ferrule 7 is such that when it is unscrewed from the body to release the tip, the tip and ferrule can be removed sideways, so that the positions of the electrode bodies in a machine do not have to be altered.

FIGURE 2 illustrates another type of replaceable tip 12 which is detachably secured to the electrode body 1 via an internally threaded sleeve 13. The sleeve 13 has a dovetailed housing 14 into which a dovetail 15 on the tip slides. A threaded part 16 of the body passes through the sleeve and opens into the dovetail housing and abuts against the tip to hold the latter in position.

In the form of tip shown in FIGURES 1, 8 and 9 and FIGURE 2, the ferrule and sleeve are locked to the body by a deformable insert 18, of rubber or plastic material, housed in an annular groove cut in the body. To facilitate locking, the sleeve and ferrule are counter-bored as shown in FIGURES 2 and 8 for co-operation with the insert.

FIGURES 5 and 7 show two different forms of dovetailed tip and FIGURE 10 shows four different forms of flanged tip.

The sleeve in FIGURE 2 may be of any desired cross-section but where spot-welding has to be carried out in corners of boxes a square or rectangular cross-section is advantageous.

The tips may be machined so that the working surface is formed at any convenient point but we prefer the working area to be formed in line with the dovetail axis.

For ease in production the tip may in certain circumstances be cut from a frusto-conical sectioned bar. Also tips according to this invention may be made to overhang the sleeve and ferrule and the electrode body, for spot welding in what would otherwise be inaccessible locations.

Electrodes in accordance with the invention are suitable for spot welding machines and possess the advantages that damaged tips may be replaced without altering the relative electrode positions and without disturbing the cooling system. A further advantage that has been found as a result of tests is that the welding life of a tip in accordance with this invention may be as much as twice that of a normal tip before re-trimming.

I claim:

1. A welding electrode comprising a hollow body shaped to permit circulation of liquid coolant through the body, a replaceable tip and means for detachably connecting the tip to the body, means locking the tip to the body, the tip and the body having surfaces which mate in a plane normal to the longitudinal axis of the body across which cooling effects and electric current can be transmitted from the body to the tip.

2. An electrode according to claim 1 wherein the means for detachably connecting the tip to the body comprises a threaded ferrule and wherein locking means are provided for locking the ferrule to the body.

3. An electrode according to claim 2 wherein the locking means consists in a deformable insert located in a peripheral groove in the body.

4. An electrode according to claim 2 or claim 3 wherein the ferrule is counterbored in that part remote from the tip for co-operation with the locking means.

5. An electrode according to claim 3 wherein the deformable insert is a ring made from rubber, plastic or similar material.

6. An electrode according to claim 2 wherein the replaceable tip and ferrule include outwardly and inwardly extending flanges respectively so that, when assembled, the flanges co-operate to hold the mating surfaces in contact.

7. An electrode according to claim 1 wherein the means for detachably connecting the tip to the body includes a sleeve internally threaded to correspond with a threaded part of the body, the sleeve having a dovetail housing transverse to the longitudinal axis of the sleeve to receive a dovetail tip, and wherein, when assembled, the threaded part of the body passes through the sleeve and abuts against the dovetail tip to hold it in position.

8. An electrode according to claim 7 wherein a deformable insert located in a peripheral groove in the body curves to lock the sleeve in a desired position on the body.

9. An electrode according to claim 8 wherein the deformable insert is a ring made from rubber, plastic or similar material.

10. A welding electrode comprising an elongated body having one end provided with a flat surface which is transverse to the longitudinal dimension of said body, said body having a bore which terminates adjacent to said surface, a welding tip having a flat surface intimately engageable with the first-mentioned surface, said tip constituting an extension of the length of said body, means detachably connecting said tip to said body, said means including means which does not extend beyond the end of said tip surface opposite said tip surface whereby said tip and body may be moved laterally with respect to each other for assembling and disassembling the same.

11. A welding electrode comprising an elongated body having one end provided with a flat surface which is transverse to the longitudinal dimension of said body, said body having a bore which terminates adjacent to said surface, a welding tip having a flat surface intimately engageable with the first-mentioned surface, said tip constituting an extension of the length of said body, said body being externally threaded adjacent to the first-mentioned surface, and a ferrule threaded onto said body and having a radially inwardly projecting flange engageable with a transverse portion of the outer surface of said tip for clamping said tip to said body, said ferrule having a length no longer than the length of said tip.

12. The electrode of claim 11 and including an annular member of deformable material fitted into an annular groove in said body, said ferrule having a bore portion which frictionally engages said annular member when said ferrule is threaded onto said body thereby locking said ferrule against loosening.

13. A welding electrode comprising an elongated body having one end provided with a flat surface which is transverse to the longitudinal dimension of said body, said body having a bore which terminates adjacent to said surface, a welding tip having a flat surface intimately engageable with the first-mentioned surface, said tip constituting an extension of the length of said body, said tip and said body having a dovetail connection therebetween which holds the same against longitudinal separation, said dovetail connection including means providing for lateral movement of said tip and body with respect to each other.

14. A welding electrode comprising an elongated body having one end provided with a flat surface which is transverse to the longitudinal dimension of said body, said body having a bore which terminates adjacent to said surface, said body being externally threaded rearwardly from said surface, a sleeve threaded onto said body and having an aperture which receives the threaded portion of said body therethrough, a welding tip having a flat surface intimately engageable with the flat surface of said body, and means providing a dovetail connection between said sleeve and said tip for holding said tip against longitudinal separation from said body but permitting relative lateral movement thereof.

15. The electrode of claim 13 wherein said dovetail connection includes a dovetail housing in said sleeve adjacent to said aperture, said housing extending transversely to the axis of said sleeve, and a dovetail tongue on said tip which intimately slidably engages said dovetail housing, said electrode further including an annular deformable member fitted into an annular groove in said body adjacent to the threaded portion thereof, said sleeve having a bore portion which frictionally engages said annular member for locking said sleeve against loosening from said body.

References Cited in the file of this patent

UNITED STATES PATENTS

| | | |
|---|---|---|
| 1,330,563 | Weed | Feb. 10, 1920 |
| 2,179,693 | Goldstein | Nov. 14, 1939 |
| 2,409,550 | Dobkowski | Oct. 15, 1946 |
| 2,437,740 | Haynes | Mar. 16, 1948 |
| 2,761,953 | Kerr | Sept. 4, 1956 |